Oct. 29, 1940.   F. E. VANDERHOOF   2,219,569
GERMICIDAL ANIMAL COLLAR
Filed Aug. 3, 1938
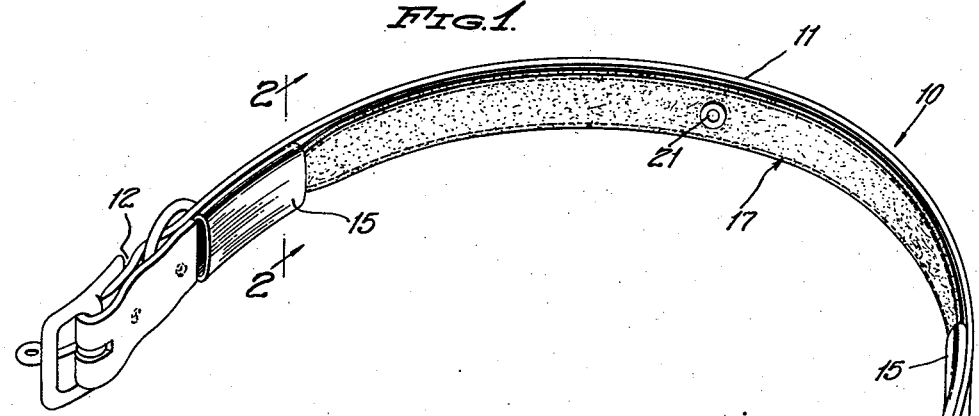
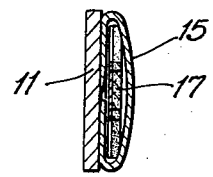
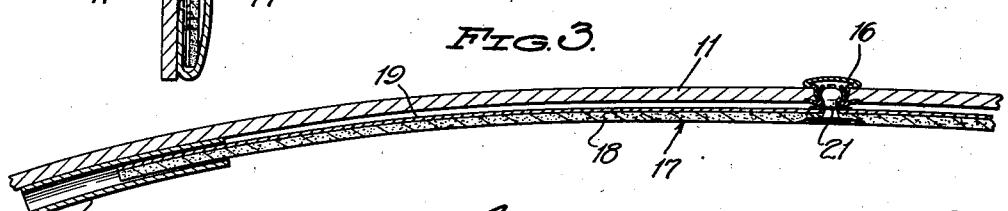
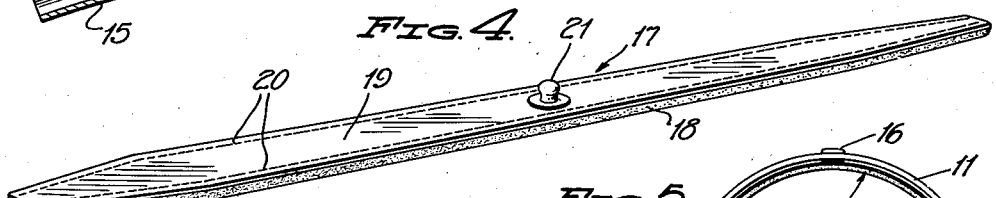
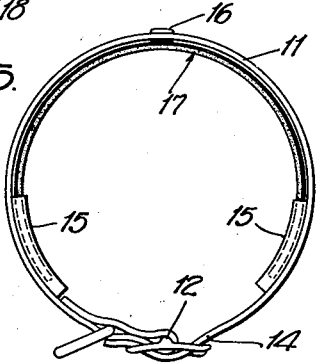
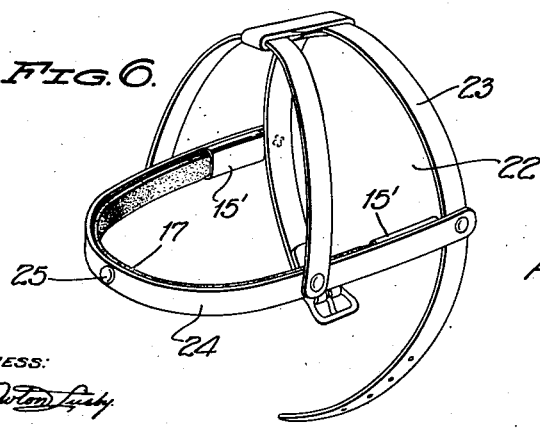
FRANK E. VANDERHOOF.
INVENTOR
BY *Ely + Pattison*
ATTORNEYS
WITNESS:

Patented Oct. 29, 1940

2,219,569

UNITED STATES PATENT OFFICE 2,219,569

GERMICIDAL ANIMAL COLLAR

Frank E. Vanderhoof, Old Greenwich, Conn., assignor of one-half to Arthur Finch, New York, N. Y., and one-half to Frank Woodrow Vanderhoof, Old Greenwich, Conn.

Application August 3, 1938, Serial No. 222,784

7 Claims. (Cl. 119—96)

This invention relates to germicidal animal collars and constitutes an improvement over the construction set forth in my co-pending patent application Serial No. 154,737, filed July 21, 1937.

The primary object of the invention is to provide an animal collar having a replaceable germicidal pad which serves as a repellant to fleas and other insects, and vermin, which inhabit the hair of dogs and other domestic animals.

Another feature of this invention resides in a novel means for removably supporting the germicidal pad on the inner side of a collar to cause the same to lie flush against the collar when it is flexed and fastened about the neck of an animal in use.

Another feature of the invention is the provision of a germicidal collar for domestic animals which is simple and inexpensive of construction, and which imparts the appearance of an ordinary collar when in position upon an animal.

Other features of the invention will be apparent as the following specification is read in conjunction with the accompanying drawing, in which:

Figure 1 is a perspective view of my improved germicidal animal collar in unfastened condition.

Figure 2 is an enlarged vertical transverse sectional view on the line 2—2 of Figure 1.

Figure 3 is a fragmentary horizontal sectional view.

Figure 4 is a perspective view of the germicidal pad per se.

Figure 5 is a side elevational view of the germicidal collar in fastened position.

Figure 6 is a perspective view of a dog's harness having my improved germicidal pad embodied therein.

Referring to the drawing by reference characters, the numeral 10 designates my improved germicidal animal collar in its entirety which includes a flexible leather collar 11 having a fastening buckle 12 carried by one end whereas the opposite end is provided with a series of spaced slots or perforations 13 and constitutes a tongue 14 for insertion through the buckle 12, the tongue of the buckle being inserted through one of these slots 13 in the usual manner when the collar is fastened about the neck of an animal.

Fixed to the inner side of the collar strap 11 inwardly of the buckle 12 and tongue 14 are pocket elements 15—15. Each element 15 is preferably constructed of leather folded into tubular or loop form with the free edges adhesively secured to the inner side of the collar strap 11. Mounted in the collar strap 11 midway between the pockets 15—15 is a female snap fastener element 16, the socket of which opens onto the inside of the collar strap.

A germicidal pad element 17 is illustrated per se in Figure 4 of the drawing and is constructed of flexible material of a length greater than the distance between the pockets 15—15, the ends of the pad element being tapered to facilitate insertion of the ends into the pockets 15—15 through the inner open ends thereof. The germicidal pad element 17 comprises an absorbent pad body 18 which constitutes the inner side of the pad and to which a leather finishing strap 19 is stitched by lines of stitching 20. Fixed to the pad element 17 and extending from the outer sides thereof is a male snap fastener element 21, the said element being positioned midway between the ends of the pad element for snapping engagement with the female snap fastener element 16. The absorbent pad body 18 is treated with an antiseptic or germicidal substance of a kind which will act as a deterrent to fleas and other vermin which infect the body of a dog or other domestic animal. The pad will be chemically treated to retain the germicidal substance for a reasonable length of time and when the strength of the substance has become exhausted after use of the pad upon the collar, the same may be replaced by a fresh pad.

The construction set forth herein assures the flat engagement of the pad element with the inner side of the collar at all time for the pad is fixed to the collar midway of its ends by the engaging snap fastener elements 16 and 21, the ends of the pad element being free to slide within the pockets 15. In my co-pending application above referred to, the germicidal pad was fixed to the collar at spaced distances along the length thereof and which construction produced a slight buckling of the pad when the collar was flexed and secured in collar forming position about the neck of an animal. Such buckling of the germicidal strap was unsightly and uncomfortable to the animal wearing the collar. By permitting flexing movement of the collar relative to the germicidal pad as herein provided, the said pad will always conform to the inner side of the collar strap.

In Figure 6 of the drawing, the invention is shown as applied to a dog harness 22 which includes an attaching collar 23, and a breast strap 24. Fixed to the breast strap 24 are pockets 15'—15' into which the ends of the germicidal pad element 17 are inserted. The pad 17 is secured midway of its ends to the breast strap 24 by a snap fastener device 25. Whereas the germicidal pad 17 is shown as fitting snugly against the inner side of the breast strap 24, it will be seen that the pockets 15' may be applied to the collar strap 23, which strap is intended to encircle the body of the animal when the harness is in position thereon.

From the foregoing description it will be seen that I have provided a simple and inexpensive germicidal dog collar which when in use upon a dog will tend to rid the dog of fleas, insects and other objectionable vermin, for the substance with which the absorbent material 18 is treated will act as a deterrent to vermin which may be present on the dog or which may try and infest the dog's body. As previously stated, when the germicidal pad 17 loses its germicidal quality, it may be removed from the collar strap and a fresh one substituted therefor.

Having thus described the invention, what I claim as new and desire to secure by Letters Patent of the United States, is:

1. In combination, an animal collar adapted to be fastened about the neck of an animal, a pair of spaced pockets secured to the inner side of said collar, a germicidal pad fitting against the inner side of said collar and having its ends respectively disposed in said pockets, and fastening means securing the intermediate portion of said pad to said collar.

2. In combination, an animal collar adapted to be flexed and fastened about the neck of an animal, a germicidal pad flatly fitting against the inner side of said collar, removable fastening means securing the mid portion of said pad to said collar, and means carried by the inner side of said collar for loosely receiving and confining the ends of said pad relative to the flexing of said collar.

3. In combination, a flexible animal collar having a buckle at one end and a perforated tongue at the other end for engagement with the buckle for securing the collar about the neck of an animal, two pockets secured to the inner side of said collar and respectively disposed inwardly of said buckle and tongue, a pad strip fitting against the inner side of said collar and having its ends loosely disposed in the respective pockets, and releasable fastening means securing the mid portion of said pad strip to said collar.

4. In a dog's collar, harness, or the like, having a flexible strap, a pair of spaced pockets secured to the inner side of said strap, a germicidal pad fitting against the inner side of said strap and having its ends respectively disposed within said pockets, and releasable fastening means securing the mid portion of said pad to said strap.

5. In combination, an animal collar adapted to be flexed and fastened about the neck of an animal, a flexible pad fitting against the inner side of said collar, means on said collar for slidably receiving the ends of said pad, and releasable fastening means for securing the intermediate portion of said pad to said collar.

6. In combination, an animal collar adapted to be flexed and fastened about the neck of an animal, a flexible pad fitting against the inner side of said collar, means on said collar for slidably receiving the ends of said pad, and coacting snap fastener elements on the inner sides of said collar and pad approximately midway between the ends thereof.

7. In a dog's collar, harness, or the like having a flexible strap, a pair of spaced loop members on the inner side of said flexible strap, a pad fitting against the inner side of said strap and having its ends respectively entering said loop members, and releasable fastening means connecting the mid portion of said pad to said flexible strap whereby the pad will flatly conform to said strap upon flexing of the latter.

FRANK E. VANDERHOOF.